May 2, 1961 R. W. HOBBS 2,982,166
FASTENER HEAD THE UNDERLYING SURFACE OF WHICH HAS
MEANS TO SMOOTH THE WORKPIECE SURFACE
Filed July 24, 1958 2 Sheets-Sheet 1
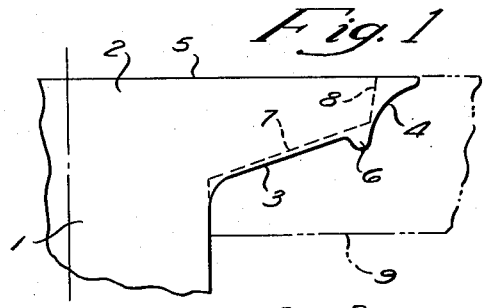
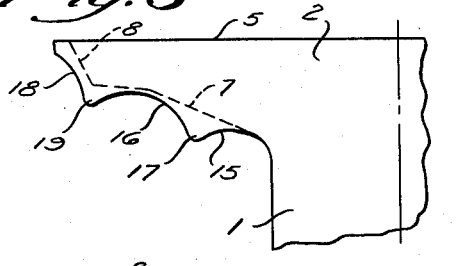
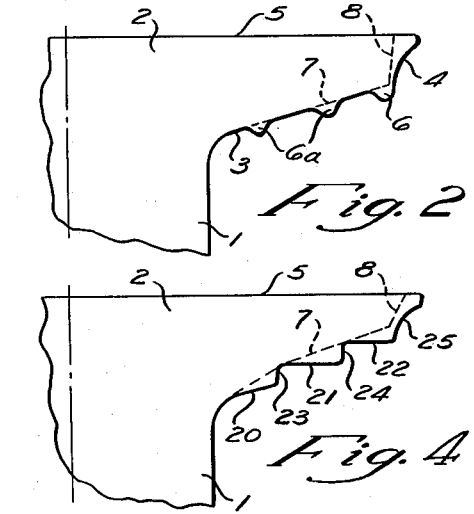
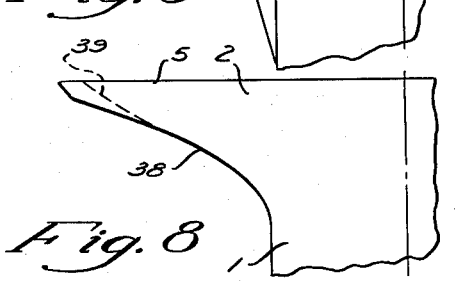
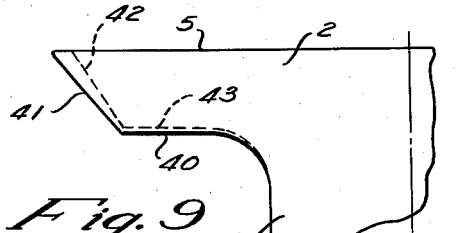
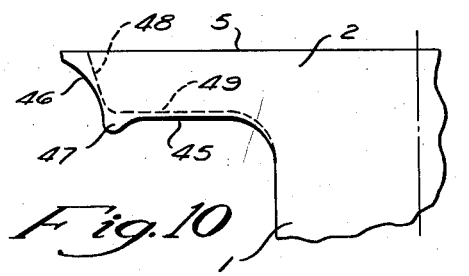
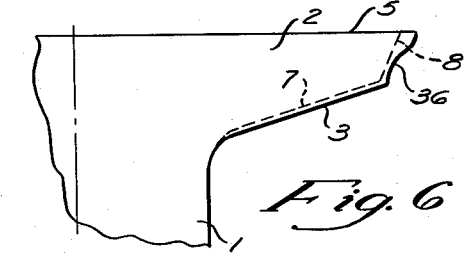
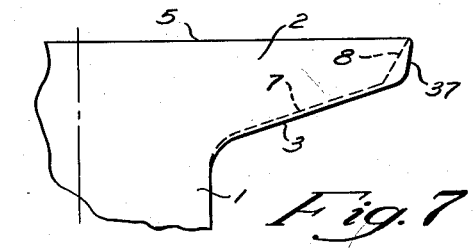
INVENTOR.
ROBERT W. HOBBS
BY
WATTS & EDGERTON
ATTORNEYS May 2, 1961 R. W. HOBBS 2,982,166
FASTENER HEAD THE UNDERLYING SURFACE OF WHICH HAS
MEANS TO SMOOTH THE WORKPIECE SURFACE
Filed July 24, 1958 2 Sheets-Sheet 2
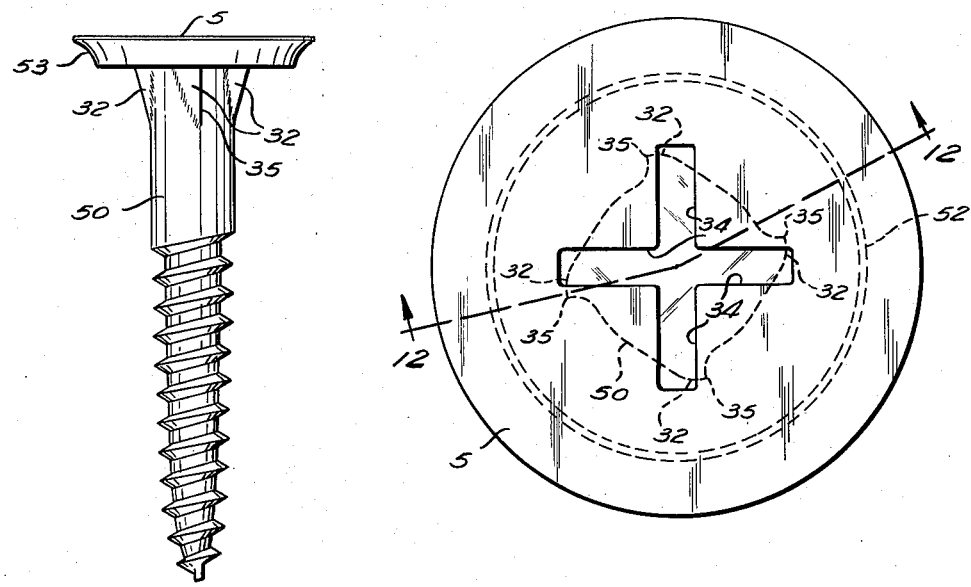
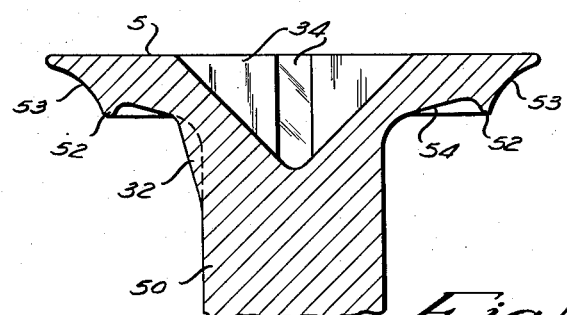
INVENTOR.
ROBERT W. HOBBS
BY
WATTS & EDGERTON
ATTORNEYS United States Patent Office 2,982,166
Patented May 2, 1961

2,982,166

FASTENER HEAD THE UNDERLYING SURFACE OF WHICH HAS MEANS TO SMOOTH THE WORKPIECE SURFACE

Robert W. Hobbs, Kendall, Fla.

Filed July 24, 1958, Ser. No. 750,726

9 Claims. (Cl. 85—41)

This invention relates generally to a new fastener for use with thin bodies, especially those composed of yieldable material which is readily split or splintered and is particularly concerned with a fastener of the countersunk type having under head surfaces which serve to clamp and bind the body material at the fastener receiving aperture and to prevent splitting and splintering of the body material and dislodgment of the fastener.

The principal object of this invention is to provide a fastener head that will develop, in a yielding material such as wood, a strength and a resistance to penetration substantially equal to the tensile strength capable of being developed in the shank portion of the fastener. When using conventional fasteners in stressed plywood structures, for example, the most common fastener failure is the penetration of the fastener head into the material and often tearing through the material. With conventional common wood screws it is generally possible to generate more holding force in the threads and more tensile strength in the shank than the head portion can transfer to the material being fastened and secured by the screw. Some of the prior efforts to avoid this shortcoming have been directed toward using more or larger fasteners. These are not satisfactory answers because of the further weakening of the material with more and larger holes. Such efforts also increase the cost of fasteners and labor for the structure.

Other prior efforts had to do with the undersurface of the head of the fastener. Since the splitting tendency was attributed to the steep conical undersurface of the head, for example, a surface making an angle of about 48° with the axis of the shank, it was thought that the splitting tendency could be reduced or avoided by forming a series of steps in the steep conical surface or by making the undersurface concave with a sharp outer edge. Neither of these proposals met with success for the steps would quickly fill with the material of the body and thereafter the splitting would be about the same as that of the smooth cone and the sharp outer edge cut the material of the body before the concave surface could do any binding or compressing.

For many years prior to this invention there has been no significant improvement in the load bearing features of the heads of American National flat head screws and because of their inadequacy the full benefits of new construction materials such as plywood, fibre board, plastics and other such new products could not be secured. The increasing dependence upon fasteners has increased the need for safer construction particularly in boats. The strength requirements have also been increasing with the increases in speed, power and the trend to use less weight and materials in the construction of many items.

Failure of fasteners in boat construction endangers both life and property. The advent of higher speeds with corresponding higher impact forces and the sinking of the boats has focused attention on the weak construction resulting with the best of the conventional screw fasteners.

The conventional countersunk flush surface screw heads split the wood and pull through the holes enlarged by the wedge shaped load bearing surfaces. This is particularly true with thin plywood construction.

The present invention is a great improvement over the standard conventional form since it greatly increases the strength and reduces the costs. The greater strength is traceable to the ability to use a fastener having an enlarged head, a shallower head receiving recess in the body material and a new binding and clamping action.

A further object of this invention is to make possible better sealing against fluid penetration between the head and the material being fastened. The conventional slotted flat head screw has no provision for sealing and the slot itself provides a definite entrance for fluids below the flat surface of the head. The head of the present fastener provides several sealing zones in series: one at the surface junction between the fastener and the material, another at the annular seal rings on some forms and another where the shank joins the head.

Another object of this invention is to provide features in a fastener which will reduce the amount of skill required to produce a high quality job. Conventional screw fasteners are too often driven too far because of the conical wedge-like load bearing surface. The present fastener head used in combination with a countersunk aperture which is proper for the material to be fastened will drive to but not beyond the proper position. The proper aperture-fastener relation also binds the raw edges of the surface layers thereby preventing splintering.

Another beneficial result flowing from the elimination of the wedging action of the conventional fastener is the corresponding elimination of the waves of excess material between the fasteners which reduce the structural strength and make accurate surface finishing impossible. It is obvious also that the undersirable wedging action also splits some materials at the fastener holes. This bad feature is avoided by the present fastener. The sealing rings acting like timber connectors also help to reenforce the material around the fastener holes.

The over all benefit includes so much increased strength and safety that fewer and smaller fasteners at less cost do a better job. The advantages are so great that large demands accompany first disclosures.

The present invention will be better understood by those skilled in the art from the following description and the accompanying drawings in which like parts are indicated by like reference characters and in which:

Figs. 1 to 10 inclusive are enlarged fragmentary longitudinal diagrammatic views of various embodiments of the present invention;

Fig. 11 is a side elevational view of a screw fastener embodying the present invention;

Fig. 12 is a cross-sectional view taken on line 12—12 of Fig. 13; and

Fig. 13 is a top plan view showing the relative position of the fastener receiving aperture in the head of the fastener and the ratchet-like ribs on the shank thereof.

In Fig. 1 the fastener shown has a shank 1 and a head 2 integral therewith. The head has a first, annular, undersurface 3 which extends outwardly from the shank at an angle of between 0° and about 30° with a plane normal to the axis of the shank. This angle is about 15 in Fig. 1. A second, annular, undersurface 4 intersects with the first surface at its outer edge and diverges upwardly. This surface is torus-like, that is it resembles part of the surface of a torus, a familiar example of which is a common donut. The outer, upper edge of surface 4 is adjacent to the top surface 5 of the head 2. Surface 4 should make such an angle with the top surface 5, that is, with a plane normal to the longitudinal axis of the shank as will not result in splitting or materially damaging the body material and that angle will vary with the different body materials. For example it may be small with material which can be compressed only to a limited extent and may be larger as the compressibility of the material increases. In general that angle should lie between about 15° and about 45°. An annular boss 6 extends downwardly from the head 2, is coaxial with the shank and is spaced outwardly some distance from the outer surface of the shank. The dotted line 7 in Fig. 1 indicates an annular seating surface and line 8 indicates an annular binding surface these surfaces partly defining an aperture through the body 9 which is to be secured by the fastener.

In Fig. 1 the diameter of head 2 is about four standard sizes larger than the diameter of the head of the American National flat head screw of the same shank size. This larger size of head is made possible by the fact that the first undersurface of the head is disposed on a small angle as stated above and by the further fact that the head receiving recess in the body material may be correspondingly shallow with the result that there is much more of the body material below the undersurface of the head and so positioned as to be clamped and bound by the head. Thus the strength of the connection is greatly increased over that of the prior fasteners.

The body 9 may consist of any suitable material and includes wood, plywood, fibre board, plastic, thin metal and the like. During assembly of the fastener of Fig. 1 with body 9 the second surface 4 of the head will first engage the binding surface 8 of the body and will exert a force over the inner part of surface 4 tending to enlarge the aperture and a force over the outer part of the surface 4 which will impede outward movement of the body material caused by the inner part of surface 4 and urge the said material in a direction generally parallel to the shank 1. When the boss 6 engages the seating surface 7 of the aperture in the body material, it will press the material engaged thereby in a direction parallel to the axis of shank 1 and will compress part of the material lying inwardly of the boss and prevent it from being moved outwardly when the first undersurface 3 of the fastener engages surface 7.

Thus it will be seen that most of the force applied to the body by the fastener will be applied substantially parallel to the shank, that some of that force will act to clamp and bind the body material at the binding surface and prevent splitting and splintering of the body material while the comparatively small amount of force applied radially to the inner surface of the aperture of the body will be insufficient to cause splitting of the material of the body and a considerable part of that force will be offset by the clamping action of the outer portion of the second undersurface 4. An important function of the second undersurface 4 is that it binds and compresses the material at the surface of body 9 thereby preventing splintering and peeling off of the surface layers of the body. Also it affords a seal against ingress of water between the fastener and body. Rib 6 provides another similar seal.

The embodiment of the present invention shown in Fig. 2 is quite like that shown in Fig. 1. The fastener of Fig. 2 differs from that of Fig. 1 primarily in that the fastener of Fig. 2 has a plurality of annular bosses 6a in addition to boss 6. These three bosses are concentric, are radially spaced and are co-axial with the shank. They all project downwardly from the first, annular, under-surface 3 and the operation and results of bosses 6a are quite like those of boss 6 of Fig. 1. The operation and results of the fastener of Fig. 2 are quite like those of the fastener of Fig. 1.

In Fig. 3, the fastener has a first, annular, under-surface which comprises a plurality of, in this case two, torus-like surfaces 15 and 16 intersect to form a downwardly extending annular boss 17 which is co-axial with the shank and radially remote therefrom. A torus-like second, annular, under-surface 18 intersects with the outer edge of surface 16 and diverges upwardly therefrom to adjacent to the top surface 5 of the head of the fastener. At the intersection of surfaces 16 and 18, an annular boss 19 is formed which is quite like boss 17 and is concentric therewith and radially spaced therefrom.

The operation of the fastener of Fig. 3 is quite like that described above in connection with Fig. 1 and differs therefrom primarily only in the effect of the torus-like surfaces 15 and 16 which serve to apply force to the body along lines parallel to the axis of the shank and to restrict any tendency of radially outward movement of the body material.

In the embodiment of the present invention shown in Fig. 4, the first, annular, under-surface of the head 2 comprises three concentric surface portions 20, 21 and 22, each disposed at approximately 0° to a plane normal to the axis of the shank. Surfaces 20 and 21 are connected by a nearly cylindrical surface 23 which is approximately parallel to the axis of the shank and surfaces 21 and 22 are similarly connected by a nearly cylindrical surface 24 which is likewise substantially parallel to the axis of the shank. At the outer edge of surface 22 torus-like surface 25 extends upwardly and outwardly and intersects with the top surface 5 of the head 2 of the fastener. The seating and binding surfaces of the aperture are indicated by the dotted lines 7 and 8. In this instance the first under surface consisting of surfaces 20, 21 and 22 first engage the seating surface on an angle of about 30° to a plane normal to the axis of the shank. The operation and results of the fastener of Fig. 4 are quite like those of Figs. 1 to 3, the main difference being in the fact that the force applied by surfaces 20, 21 and 22 to the body being fastened is applied to a greater extent substantially parallel to the axis of the shank than is the case of the fasteners of Figs. 1 to 3.

In the embodiment of the invention shown in Fig. 5, the first, annular, under-surface 30 of the head 2 is quite like surface 3 of Fig. 1 but does not include an annular rib, such as rib 6, and the second, annular, under-surface 31 is substantially conical and extends from its intersection with the outer edge of surface 30 to adjacent to the top surface 5 of the head of the fastener.

The fastener of Fig. 5 includes a plurality of ribs 32 integral with the shank and head and extending radially outward from the shank. A tool receiving recess (see Figs. 12 and 13) extends downwardly from the top surface 5 of the fastener and includes branches 34 extending radially of the fastener substantially parallel to ribs 32. The positioning of these recesses and ribs is better shown in Fig. 11 in which the recess is seen to be cruciform in plan view and the ribs 32 and shank are defined by substantially flat surface constituting the face planes of a four sided pyramid with the outer edges 35 of the ribs being ratchet-like in shape, that is with a leading surface inclined at a small angle to the flat surface of the pyramid and with the trailing surface being approximately parallel to the adjacent branch of the recess. As will be seen by reference to Fig. 13, each of these ribs is approximately parallel to the adjacent branch of the cruciform recess.

An important advantage of the ribs 32 is that they serve to indicate to the mechanic when the under-surface 30 is nearing surface 7 of the body. Since the ribs increase in radial length as they approach surface 30, the torque correspondingly increases and becomes greatest just before surface 30 seats on surface 7. By adjusting the means which drives the fastener to shut off at a predetermined torque, each fastener may be driven to the proper seating automatically. In operation and results the modification of Fig. 5 is quite like that of Figs. 1 to 4 except that the function performed by the annular ribs is lacking and the function of preventing or impeding unscrewing of the fastener which are performed by the ribs 32 is present.

The head of the fastener of Fig. 5 may be formed by upsetting the end of a metal rod in a die including a punch-like part shaped to displace the metal to form the recess and to move the displaced metal outwardly and full the rib forming cavities.

The modifications shown in Figs. 6 and 7 are quite similar and both are much like that shown in Fig. 5 except that the ribs 32 of the latter figure have been omitted from these two figures. The main difference between these modifications is in the shape of second surfaces 36 and 37 and the nature and extent of their engagement with the binding surface of the body to be fastened. Surface 36 is adapted for use with soft body material and surface 37 is suited to use with hard material. The operation and results of the modification of Figs. 6 and 7 are substantially the same as that of Fig. 5 except that the functions performed by the ribs 32 are not performed by the modifications of Figs. 6 and 7.

In Fig. 8 is shown a modification of the invention which is quite like that shown in Figs. 6 and 7. In this case, however, the first, annular, undersurface 38 is disposed at an angle of about 30° to a plane normal to the axis of the shank and this first under-surface extends nearly to the upper surface 5. The dotted line 39 indicates the seating and binding surfaces of the aperture in the body material. The operation and results of the modification shown in Fig. 8 will be understood from the foregoing description of operation and results of the preceding modifications. The first under-surface 38 is so inclined that it tends to cause very little outward movement of the material of the body material being fastened, most of the force applied by the fastener to the material being applied more or less parallel to the shank of the fastener thereby tending to clamp and bind the body material.

The modification of Fig. 9 is quite like that shown in Fig. 5, the main differences being that ribs 32 of Fig. 5 have been omitted and the first, annular, under-surface 40 is disposed at about 0° to a plane normal to the axis of the shank. The second, annular, under-surface 41 is substantially conical and intersects with the outer edge of surface 40 and with the top surface 5. The dotted lines 42 and 43 indicate the seating and binding surfaces of the aperture in the body material. As the relative position of these surfaces and surfaces 40 and 41 indicate, the fastener first applies force to the upper end of binding surface 42 tending to force it outwardly and downwardly and such movement continues until surface 40 engages seating surface 43. The device of Figure 9 has much the same mode of operation and results as has been described in the other modifications differing therefrom mainly in direction and degree.

Fig. 10 illustrates another embodiment of the present invention. In this instance the first, annular, under-surface 45 makes an angle of about 0° with a plane normal to the axis of the shank and the second, annular, under-surface 46 is torus-like and is closely comparable to surface of Figs. 1 and 2. At the intersection of surface 46 with surface 45 an annular rib 47 is formed which corresponds to rib 6 of Fig. 1. The dotted lines 48 and 49 indicate binding and seating surfaces of the aperture in the body. The operation and results of the fastener of Fig. 10 are quite like those of Figs. 1 to 5.

Figs. 11 to 13 show the present invention embodied in a fastener having a screw threaded shank 50 and a head having ribs 32, an annular rib 52 and second, annular, under surfaces 53 and 54 are quite like parts 4 and 6 of Fig. 1.

It will be understood that features shown in any one of the 10 modifications above described may be incorporated in any of the other modifications without departing from the spirit of this invention. For example the rib 32 of Fig. 5 may be added to any of the other modifications. Similarly, any of the modifications of Figs. 6, 7, 8, 9 and 10 may be provided with a plurality of annular ribs after the fashion of Fig. 2. Also the cruciform recess may be altered to a screw driver receiving recess by omitting one of the opposed pair of branches of the cruciform recess. Either of these recesses may be used with any of the modifications of Figs. 1 to 9. Also the torus-like surfaces may be replaced by conical surfaces whenever desired.

It will also be understood that the top surface of fasteners embodying this invention need not be flat or flush with the body to be fastened but, on the contrary may be curved and may lie above the surface of that body.

It will be noted that in each modification there is a good water tight seal made by engagement of the outer part of the second under surface of the fastener head with the binding surface of the body, that the first under surface makes good water flow preventing contact with the seating surface, and that the annular ribs on the head afford still other and exceptionally good water tight seals with the body. Thus fasteners embodying the present invention not only prevent splitting, splintering, peel-off and pull-through of a wide variety of body materials, but also serve to effectively prevent ingress of water around the fastener.

Having thus described this invention in such full, clear, concise and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A fastener comprising a shank having a head at one end thereof, said head having an outer end surface provided with means to receive a fastener rotating tool and having first and second smooth, continuous, annular surfaces, the first said annular surface extending outwardly from the shank toward said end surface of the head and making an angle of between about 0° and about 30° with a plane normal to the longitudinal axis of the shank, the said second annular surface partly defining a periphery of the head and extending lengthwise of the fastener from adjacent to said end surface, and means operative as the fastener is rotated to iron out and smooth the surface of the body to be secured by said fastener and to compress said body substantially parallel to the shank without materially damaging said body, said means including at least one annual offset portion coaxial with said shank and having side surfaces smoothly merging into said first and second annular surfaces and a smooth surface free from sharp edges connecting said side surfaces.

2. The combination of elements set forth in claim 1 in which the fastener is a screw and in which the end of the shank opposite the head is screw threaded.

3. The combination of elements set forth in claim 1 in which the said second annular surface is torus like.

4. The combination of elements set forth in claim 1 in which the said offset portion is in the form of a rib extending lengthwise of the fastener.

5. The combination of elements set forth in claim 1 in which at least one additional annular offset portion coaxial with the shank is provided and has side surfaces smoothly merging into said first annular surface.

6. The combination of elements set forth in claim 1 in which the said first annular surface makes an angle of approximately 15° with a plane normal to the longitudinal axis of the shank.

7. The combination of elements set forth in claim 1 in which said first and second annular surfaces are frusto-conical.

8. The combination with the fastener set forth in claim 1 of a body to be fastened, said body having an aperture which is to receive the fastener and which is defined in part by a frusto-conical binding surface, said binding surface having a diameter less than said second annular surface of the fastener and being engaged thereby prior to the seating of the first said annular surface of the fastener on the body.

9. The combination of elements set forth in claim 8 in which the aperture in the body is also provided with a frusto-conical seating surface of smaller diameter than said binding surface and making an angle of between about 0° and about 30° with the outer surface of the body to be fastened and in which the first said annular surface of the fastener contacts with the said seating surface of the aperture subsequent to the exertion of binding action of said second annular surface of the fastener on said binding surface of the body.

References Cited in the file of this patent

UNITED STATES PATENTS

| | | |
|---|---|---|
| 1,894,708 | Sardeson | Jan. 17, 1933 |
| 1,955,924 | MacLean | Apr. 24, 1934 |
| 2,096,598 | Sheane | Oct. 19, 1937 |
| 2,199,809 | Pigott | May 7, 1940 |
| 2,229,892 | Hosking | Jan. 28, 1941 |
| 2,764,053 | Lovisek | Sept. 25, 1956 |
| 2,764,197 | Torresen | Sept. 25, 1956 |

FOREIGN PATENTS

| | | |
|---|---|---|
| 113,183 | Great Britain | Feb. 14, 1918 |